INVENTORS
William H. Stout and
Paul H. Raumaker

Jan. 1, 1957   W. H. STOUT ET AL   2,775,979
AUTOMATIC DRAIN VALVE FOR PIPELINES
Filed June 23, 1953   3 Sheets-Sheet 2

INVENTORS
William H. Stout and
BY Paul H. Raumaker

Atty.

INVENTORS
William H. Stout and
BY Paul H. Raumaker
Atty.

United States Patent Office 2,775,979
Patented Jan. 1, 1957

2,775,979

AUTOMATIC DRAIN VALVE FOR PIPELINES

William H. Stout and Paul H. Raumaker, Portland, Oreg.

Application June 23, 1953, Serial No. 363,512

13 Claims. (Cl. 137—107)

This invention relates to apparatus for draining pipelines and has been found to be particularly applicable to irrigation pipelines and hydraulic pressure responsive automatic drain valves for such pipelines.

In connection with irrigation lines of the portable type, it is desirable to have a system which will automatically open and drain the line as soon as the water supply to the sprinkler heads is shut off and a very slight pressure drop thereafter takes place in the line, but which will not waste water when the supply to the sprinkler head is again turned on. Rapid draining is necessary because the purpose of draining is to make the line light enough to be promptly moved as a unit without taking it apart.

According to known methods of draining lines, the valves have been normally left open and the water pressure in the lines utilized to close the valve. As soon as the pressure decreased, the valves openend to drain the lines and remained open. Valves are known which open and close under hydrostatic pressure and the present invention is an improvement in such prior art devices.

The object of the invention is the provision of a simple and efficient apparatus of draining lines and an automatic drain valve which will permit the line to be left in a normally closed condition to receive water. Once pressure is built up in the line, the drain valves will be prepared to open so that when the pressure is decreased the valves will automatically open to drain the line, whereafter they will close, leaving the line in condition for use.

This and other objects and advantages of the invention will be apparent from the following description taken in conjunction with the drawings forming part of the specification, and in which:

Fig. 7 is a view similar to that of Fig. 6, but showing the valve elements in the position they occupy immediately after the water supply to the irrigation line is turned on;

Figure 1:
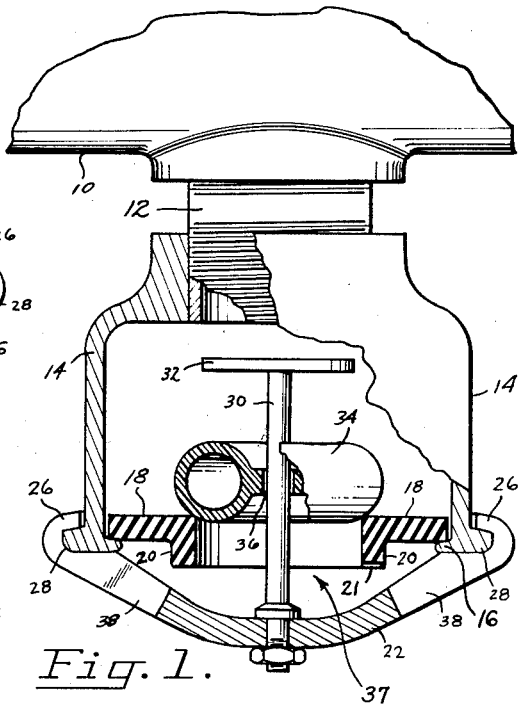
Fig. 1 is a view in transverse section of a drain valve embodying the invention, with the elements thereof shown in the position which they occupy when the irrigation line is empty.

Referring to the drawings, and specifically to Figs. 1–5, 10 indicates a section of irrigation pipeline having at the underside thereof a nipple fitting 12 to which there is secured a valve housing 14. Frictionally fitted within the lower end of housing 14 in engagement with inwardly directed housing flange 16 is an annular resilient member 18, preferably of rubber or the like, having an abbreviated dependent skirt or lip portion 20. A relatively small bleeder hole 21 may extend through lip 20.

The bottom of housing 14 has a dished plate 22 having a plurality of equi-spaced radial fingers 24 terminating in re-entrant, or hooked, portions 26. The bottom plate 22 is connected to the housing 14 by fitting the radial portions 24 between equi-spaced finger flanges 28 and by rotating the bottom relative to the housing clampingly to engage the re-entrant portions 26 of the bottom over the finger flanges 28.

Bottom 22 has secured thereto an upstanding stem 30 which has at its upper end a disk 32. A doughnut-shaped buoyant member or float 34 is loosely fitted on stem 30 for sliding movement thereon. The loose fit of float 34 on stem 30 provides an annular bleeder passage 36 for a purpose hereinafter described.

Referring to Fig. 1, a chamber 37 is defined by lip 20 of the resilient member, the under surface of float 34 and the bottom 22 of the housing. In its normal or at rest condition (Fig. 1), chamber 37 is closed at the top and connected to open drain ports 38 at the bottom. While the ports in this condition are not sealed by lip 20, as they are in Fig. 2, the valve is closed and water will not run out through ports 38. When the water supply to line 10 is turned on, the flow pressure of the water into housing 14 acts against buoyant member 34 and resilient sealing member 18, resulting in the condition shown in Fig. 2 at or about the time that a full, or operational, pressure condition has been obtained within line 10. As the members 34 and 18 are urged downwardly by the dynamic pressure, float 34 is in substantial fluid sealing engagement with member 18, and consequently no water passes these members to issue from drain ports 38 constituted by the space between radial portions 24 and bottom 22, except for a very minor amount of water which may pass through bleeder passage 36 before lip 20 of member 18 is deflected to engage bottom 22 and seal off the drain ports, as shown in Fig. 2.

Figure 2:
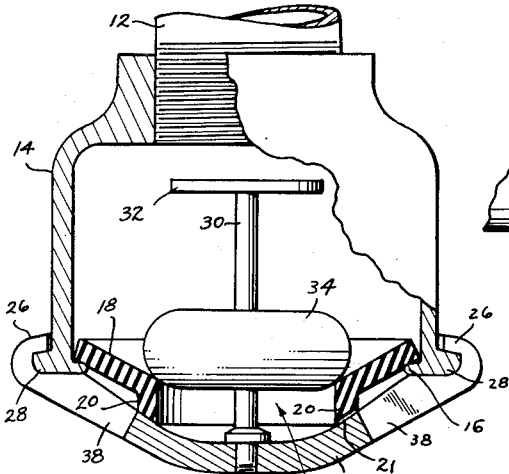
Fig. 2 is a view similar to that of Fig. 1, but showing the valve elements in the position they occupy immediately after the pressure within the irrigation line has been increased to an operating level.
Figure 3:
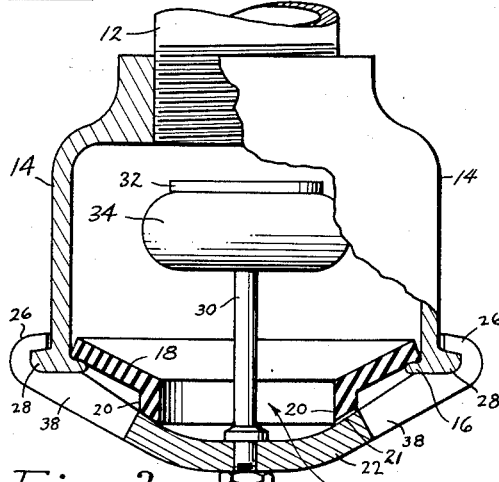
Fig. 3 is a view similar to those of Figs. 1 and 2, showing the valve elements in the position they occupy subsequent to the position of Fig. 2 but while the irrigation line is still under an operating pressure condition.
Figure 4:
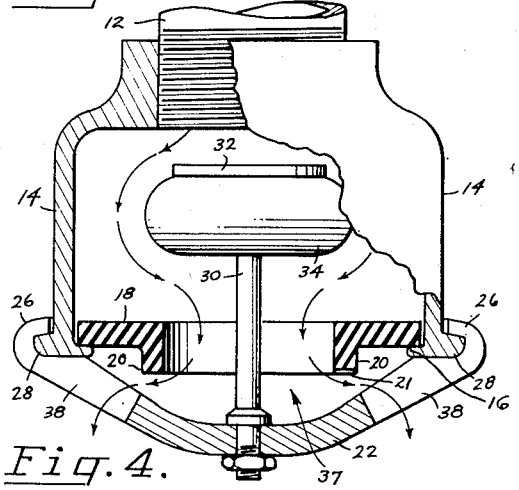
Fig. 4 is a view similar to those of Figs. 1–3, showing the position of the valve elements immediately after the water supply to the irrigation line has been cut off.
Figure 5:
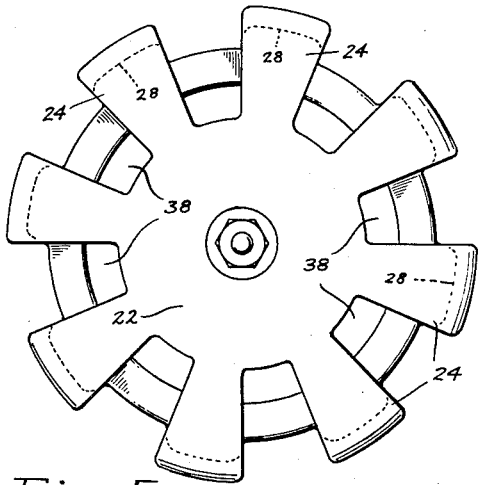
Fig. 5 is a bottom plan view of the valve assembly of Figs. 1–4.

Shortly after the valve elements have assumed the position of Fig. 2, pressure is equalized at both sides of float 34 by the passage of water through bleeder passageway 36. If a bleeder hole 21 is provided in lip 20, the equalization of pressure on both sides of the float will be slightly retarded and will help insure that all air pockets which might cause sudden drops in pressure are eliminated from the pipeline. When the pressures are thus equalized on both sides of float 34, it floats upwardly on stem 30 to engage disk 32, the latter serving as a retainer for the float, and being so posioned as to prevent the latter from blocking the lower end of nipple 12. The static pressure within the housing maintains member 18 in sealing relation to drain ports 38, and thus the valve condition of Fig. 3 is maintained until such time as the water supply to line 10 is shut off.

When the water supply to line 10 is shut off, and the static pressure within housing 14 acting on member 18 becomes insufficient to oppose effectively the tendency of member 18 to return to the unstressed position of Fig. 1, sealing lip 20 is raised to open the drain ports 38, thus enabling a complete draining of line 10. It will be appreciated that the elastic strength of member 18 may be such as to allow the opening of the valve upon a very slight decrease in the static pressure within housing 14, or, in other words, to allow the valve to open as quickly as desired upon the shutting off of the water supply to line 10.

As the water drains from housing 14, the buoyant member 34 moves downwardly until it reaches the empty line valve closing position of Fig. 1, whereupon the valve is once again closed and ready to receive water.

It will be appreciated that the construction materials and size of the various elements of the drain valve may be altered to cause operation of the valve according to any desired predetermined time cycle. In other words, depending on the resiliency of the rubber sealing member, size of the ports and chamber, etc., the valve can be made fast or slow acting, sensitive or sluggish.

Figure 6:
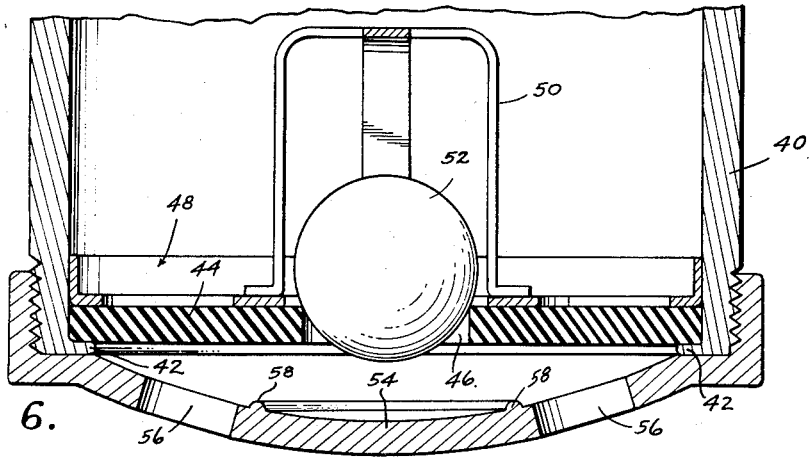
Fig. 6 is a view in transverse section of a modified form of the drain valve of the invention, showing the position of the valve elements when the irrigation line is empty.
Figure 7:
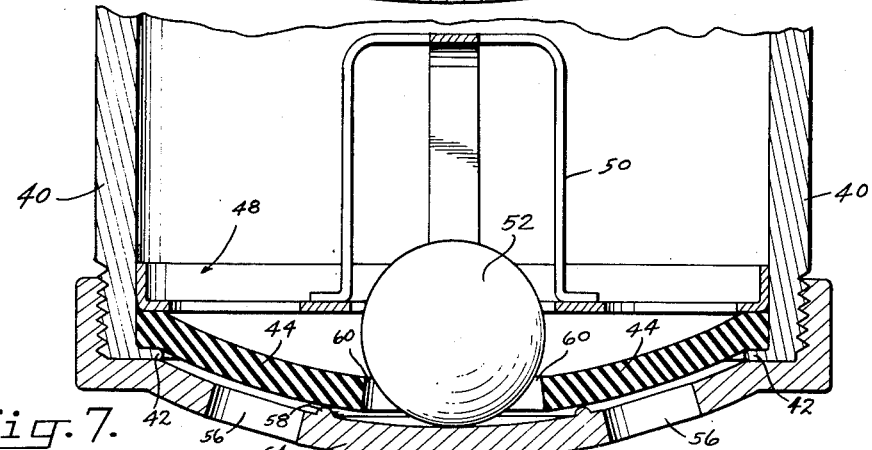
Figure 8:
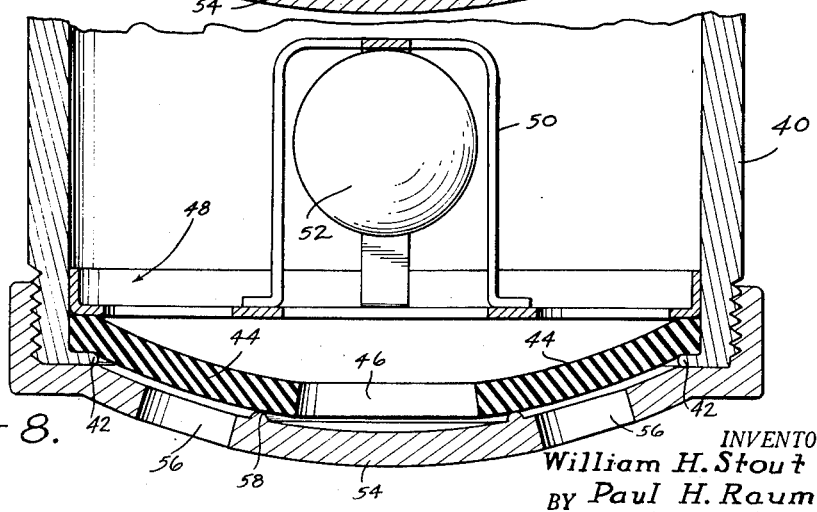
Fig. 8 is a view similar to that of Figs. 6 and 7, showing the condition of the valve elements shortly after the pressure within the irrigation line has reached an operational level.

A modified form of the automatic drain valve of the invention is shown in Fig. 6–8. Here, valve housing 40 is provided with an inwardly extending flange 42 supporting a resilient annular rubber-like member 44, having a centrally disposed aperture 46. Disposed at the upper side of disk 44, in frictional engagement with housing 40 and in alignment with aperture 46, there is a spider indicated generally at 48. Secured to the spider is a lattice-type cage 50 within which there is disposed a ball-shaped float 52, adapted to seat in sealing relation with aperture 46 of disk 44.

Housing 40 is provided with a bottom 54 which is threadably secured to the housing, with the bottom having formed therein a plurality of radially disposed drain ports 56. Disposed centrally of bottom 54 is an annular lip or bead 58, adapted to be engaged by disk 44 to seal off drainage ports 56.

The valve is operable in the following manner. When the water supply to the pipeline is turned on, float 52 and disk 44 are urged downwardly by the build up of static pressure within housing 40 from the empty line condition of Fig. 6 through the initial stage of full pressure line condition of Fig. 7.

From Fig. 6 it will be noted that the float, when in sealing relation with disk 44, extends slightly below the lower surface of the disk. Thus, as members 52 and 44 are moved downwardly, float 52 engages bottom 54 before disk 44 engages sealing bead 58. Relative movement of disk 44 downwardly with respect to member 52 to engage bead 58 thus provides an annular bleeder passage 60 between members 44 and 52. This bleeder passage enables the water pressure to become equalized around the float, with the result that it floats upwardly within its retainer cage 50. Fig. 8 therefore shows the valve element condition which is maintained during normal operating pressure line conditions of the pipeline.

When the water supply to the pipeline is shut off, the resilient disk member, in response to a slight drop in static pressure within the pipeline, raises to its normal position of Fig. 6 to allow the pipeline to be drained through the drain ports. As the housing is drained, float 52 moves downwardly to seat within aperture 46 of the disk, at which time the pipeline is fully drained and closed.

Referring to Figs. 9–12, another embodiment of the invention is shown. Pipeline 10 is provided, preferably at its underside, with an automatic drain valve indicated generally at 62 and embodying a one-piece resilient rubber-like member 64, comprised of a centrally disposed hollow-dome portion 66, outwardly disposed pad portions 68, and a longitudinally disposed flexible tension member or arcuate rim portion 70. The pad portions 68 are adapted to seal off drain ports 72 in the line. The valve is connected to the pipeline by stud 74 and nut 76 in threaded relation therewith, with said stud extending through the following elements which are maintained in mutually clamped relation between the head of the stud and nut 76: rubber sealing washer 78; clamping disk 80 which is peripherally anchored within annular groove 82 formed in member 64 and serves to clamp portion 84 of member 64 to the pipeline wall; the wall of pipeline 10; spacer washer 86; and dished catch-plate 88. The catch-plate is provided with a plurality of radially disposed apertures 90; and communication between the atmosphere and chamber 92 defined within rubber member 64 is normally provided by an axially disposed vent passage 94 extending through stud 74.

Figure 9:
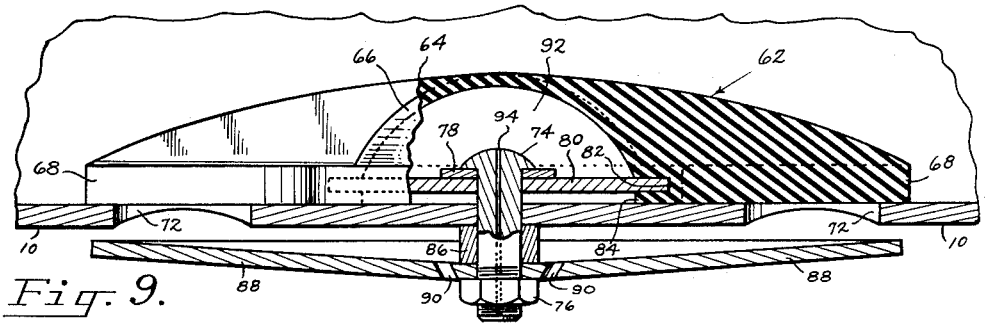
Fig. 9 is a view in transverse section of another embodiment of the invention, showing the condition of the valve when the line is empty.
Figure 10:
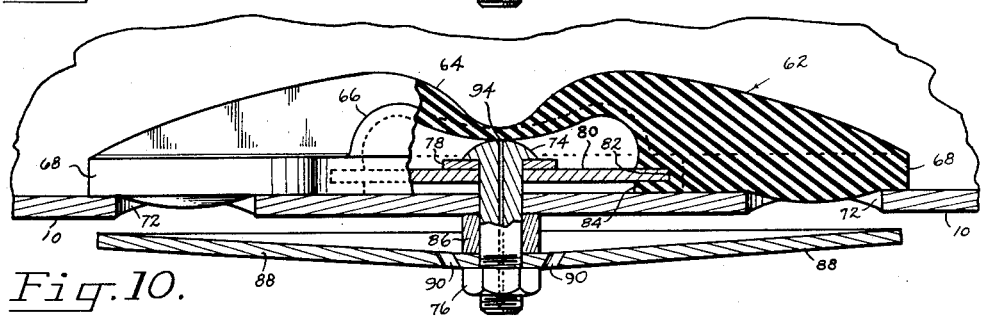
Fig. 10 is a view similar to that of Fig. 9, but illustrating the condition of the valve when the pressure within the line has been built up to an operational value.

It will be noted from Fig. 9, representing the empty condition of the pipeline, that the pad portions are disposed in sealing relation to the drain ports. When the source of pressure to the line is turned on to build the pressure up to operational value for irrigation use, the static pressure within the line, as illustrated in Fig. 10, partially deflated the dome portion of the rubber member into engagement with the head of stud 74, thereby setting up a partial vacuum in dome chamber 92, while the static pressure acting against the pad portions serves to maintain these portions of the rubber member in sealing relation to the drain ports. The deflating of the dome places a stress on the walls of chamber 92 as well as on other portions of valve 62 which, as will be clear from what follows, when released assist in operating the valve.

Figure 11:
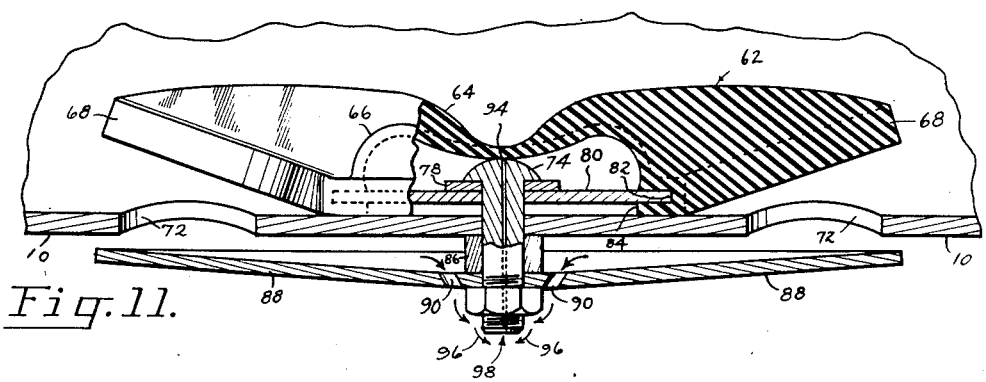
Fig. 11 is a view similar to Figs. 1 and 2, but illustrating the condition of the valve during the period from the shutting off of the pressure source to the line to the complete draining of the line.
Figure 12:
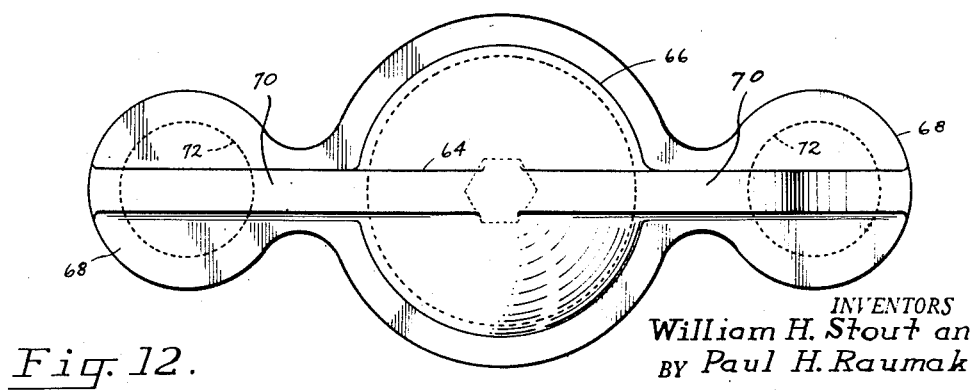
Fig. 12 is a top plan view of the valve of Fig. 9.

The valve condition of Fig. 10 is maintained during operational use of the pipeline until the static pressure within the line is reduced slightly below normal operational pressure values, as by turning off of the pressure source. When the static pressure is thus reduced, the pad portions move upwardly to unseal the drain ports, as indicated in Figure 11, under the lever action of the centrally depressed and stressed arcuate rim 70. The less than atmospheric pressure condition within chamber 92 serves to maintain the dome in a partially deflated condition.

Dome 66 is maintained in sealing relation with vent 94, until the pipeline is fully drained, in the following manner. The disposition of catch-plate 88 and the dish formed thereof causes the space between the catch-plate and the pipeline to be flooded by the drain water. Water from above the catch-plate passes through the apertures 90, as indicated by flow arrows 96 in Fig. 11, to form a fluid tight air seal with respect to vent passage 94 by flowing over its bottom end 98. When the pipeline has been fully drained, this fluid seal is broken permitting chamber 92 to reinflate, thereby unstressing rim 70 and causing pad portions 68 to be moved to seal the drain ports, as shown in Fig. 10.

While various embodiments of the automatic drain valve of the invention have been shown and described, other embodiments will be suggested to those skilled in the art and it is to be understood that all substantial equivalents thereof are deemed to be within the spirit and scope of the invention, which is limited only by the appended claims.

We claim:

1. An automatic drain valve for a fluid dispensing pipeline having at least one drain port comprising a resilient member normally covering said port, a normally inflated dome portion of said resilient member, a passageway connecting the dome portion with the atmosphere, means for controlling pressure in the pipeline partially to deflate said dome whereby when the pressure is decreased the member will be moved to open the port until the dome is reinflated, whereafter the port is closed.

2. The device according to claim 1 and in which a tension member connects the dome portion of the resilient member with the portion which covers the drain port.

3. The device according to claim 1 and a cage for the float supported above the hole in the resilient member whereby the float may move into and out of contacting relation with the resilient member.

4. An automatic drain valve for a fluid dispensing pipeline comprising a valve housing open to the inside of the pipeline, at least one drain port provided in the housing, an annular resilient member supported in the housing and adapted to be moved into and out of sealing relation with the port, a float supported in the housing and adapted to be moved into and out of contact with said resilient member, and means for controlling pressure in the pipeline.

5. An automatic drain valve for irrigation pipeline comprising a valve housing for receiving water from the line, said housing having drain ports in its bottom, a float movable within the housing, a resilient member mounted in the housing in cooperative relation with the float and the ports, said member and float being movable into different positions to open and close the valve, and means for controlling the water pressure in the line.

6. An automatic drain valve for irrigation pipeline comprising a valve housing open to the line, said housing having drain ports in its bottom; a float vertically movable within the housing, an annular resilient member mounted in the housing in cooperative relation with the float and the ports; a chamber defined within the housing by the bottom of the housing, the resilient member and float; a passageway at the float to permit water to enter said chamber; in one position said member and float substantially closing the valve and in another position portions of the member sealing said ports to close the valve; means for maintaining and decreasing water pressure in the line whereby when pressure is applied in the line the resilient member will be moved from a normally open position with respect to the drain ports to close them, and when the chamber is full of water the float will rise out of operative relation with the member, and when pressure is decreased in the line below a predetermined amount the member will resume its normally open position permitting the line to drain, whereafter the float contacts the member substantially to close the valve.

7. An automatic drain valve for an irrigation pipeline having drain ports comprising a normally inflated central portion, a passageway connecting said central portion with the atmosphere, portions on either side of said central one normally covering the drain ports, flexible means extending between the side and central portions, means for controlling water pressure in the line partially to deflate the central portion, whereby when pressure is decreased in the line the side portions will be moved to open the ports until the central portion is reinflated, whereafter the side portions will be moved to close the ports.

8. An automatic drain valve for irrigation pipeline having drain ports comprising a normally inflated dome portion of the valve positioned between the ports, a passageway connecting said dome portion with the atmosphere, pad portions on either side of said dome normally covering the ports, an arcuate tension member extending between the pad portions and the dome, means for maintaining and decreasing water pressure in the line, whereby when pressure is applied in the line the dome portion will be partially deflated to apply tension on the arcuate member, and when pressure is decreased in the line below a predetermined amount the pad portions will be moved to open the drain ports to establish a fluid seal at the passageway until the water has drained from the line, whereafter the dome may reinflate and remove tension from the member to permit the pads to close the ports.

9. The device according to claim 8 and a plate positioned beneath the ports adapted to catch the water as it passes through said ports and direct the water around the open end of said passageway to form a fluid seal.

10. An automatic drain valve for irrigation pipeline comprising a valve housing open to the line, an annular resilient member mounted in the housing, a dish-shaped bottom for the housing having drain ports, radial fingers extending from the bottom, hooked portions on the ends of said fingers, flanges on the side walls of the housing cooperating with said hooked portions on the fingers to lock the bottom of the housing in place, a stem centrally upstanding from the bottom, a restraining disk at the top of the stem, a float loosely fitting around the stem and slidable thereon and movable into and out of contact with the resilient member, and means for controlling water pressure in the line to move the resilient member into and out of sealing relation with the ports.

11. The device according to claim 10 and in which a lip having a hole therethrough open to the atmosphere is adapted to be moved substantially to seal the ports.

12. An automatic drain valve for irrigation pipeline comprising a valve housing open to the line, a flange on the side walls of the housing, an annular resilient member supported on the flange having a central aperture, a cage supported above the resilient member in line with the aperture, a float in the cage adapted to be moved into and out of sealing relation with the aperture, a bottom on the housing below the resilient member having a plurality of drain ports, a bead on the inside surface of the bottom surrounding the ports, and means for moving the resilient member into and out of contact with the bead to seal the ports.

13. An automatic drain valve for a pipeline having at least one port positioned in the bottom of the valve comprising an annular resilient member having a top and bottom in cooperative relationship with the port, a pressure responsive portion of said resilient member adapted to be moved into and out of sealing relation with the port, a chamber in the valve at least one of whose walls is defined by the resilient member, means for applying fluid pressure to the top of the member to move said pressure responsive portion of the member and open the port when the pressure in the pipeline falls below a predetermined amount to drain the pipe, and a movable element for moving the pressure responsive portions of the member to close the valve when the line has been substantially completely drained.

References Cited in the file of this patent

UNITED STATES PATENTS

| | | |
|---|---|---|
| 1,992,495 | Lynde | Feb. 26, 1935 |
| 2,133,575 | Rosenberg | Oct. 18, 1938 |
| 2,341,758 | Carpenter | Feb. 15, 1944 |
| 2,561,296 | Stout | July 17, 1951 |
| 2,587,961 | Bletcher | Mar. 4, 1952 |

FOREIGN PATENTS

| | | |
|---|---|---|
| 4,227 of 1912 | Great Britain | Feb. 20, 1912 |
| 545,646 | Germany | Mar. 4, 1932 |